United States Patent
Yoshikawa et al.

[15] 3,653,285
[45] Apr. 4, 1972

[54] APPARATUS FOR TRIMMING OPENING RIMS OF SYNTHETIC-RESIN CONTAINERS

[72] Inventors: Shinsuke Yoshikawa; Yuji Sawa, both of Iwaki, Japan

[73] Assignee: Kureha Kagaku Kogyo Kabushiki Kaisha, Tokyo-to, Japan

[22] Filed: July 10, 1970

[21] Appl. No.: 53,732

[52] U.S. Cl. .................................. 82/101, 82/48, 82/85
[51] Int. Cl. ..................... B23b 3/04, B23b 7/00, B23b 5/14
[58] Field of Search .................. 82/46, 47, 48, 59, 85, 60, 82/101; 83/411

[56] References Cited

UNITED STATES PATENTS

| | | |
|---|---|---|
| 2,298,366 | 10/1942 | Gladfelter et al. .................. 82/101 |
| 2,701,015 | 2/1955 | Gottschalk .................. 82/85 |
| 3,084,578 | 4/1963 | Hartford .................. 82/60 |
| 3,400,620 | 9/1968 | Armbruster et al. .................. 82/47 |
| 3,291,168 | 12/1966 | Zitner .................. 83/411 |

Primary Examiner—Harrison L. Hinson
Attorney—Wenderoth, Lind & Ponack

[57] ABSTRACT

Several trimming devices are mounted in a circle on a turn-table and thereby undergo orbital revolution, each trimming device comprising a rotary holder for holding a synthetic-resin container having a neck, a clamping device for firmly holding the neck, and a cutting-tool device for feeding a knife to the container in rotating state to trim off surplus material from the opening rim, and coordinating mechanisms are provided so that, during one revolution of the turn-table, each of the trimming devices successively carries out one cycle of the operational steps of receiving a container, trimming the rim thereof, and discharging the same.

2 Claims, 7 Drawing Figures

SHINSUKE YOSHIKAWA INVENTORs
and YUJI SAWA,

ATTORNEYS

SHINSUKE YOSHIKAWA and
YUJI SAWA,

INVENTORs

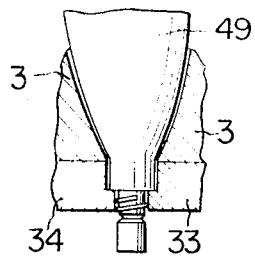
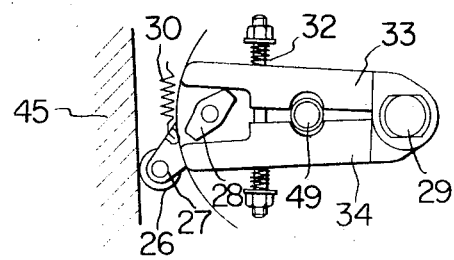
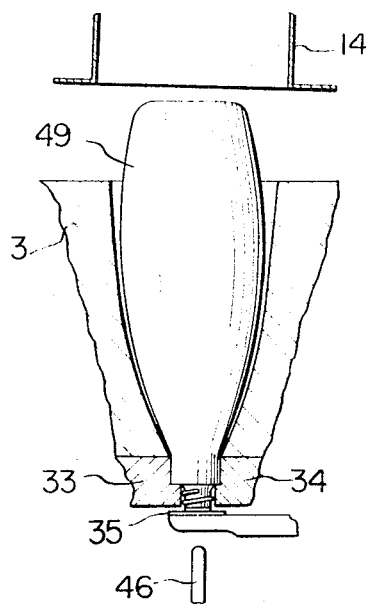

3,653,285

APPARATUS FOR TRIMMING OPENING RIMS OF SYNTHETIC-RESIN CONTAINERS

BACKGROUND OF THE INVENTION

This invention relates generally to automatic tools and more particularly to a new and improved apparatus for automatically and efficiently cutting off surplus material from the rim parts of openings of synthetic resin container structures produced by hollow molding and other techniques. Examples of such structures are tubes and bottle-like containers for products such as ketchup and mayonnaise.

In trimming or removing surplus material from the opening rim parts of container structures of relatively rigid synthetic resins such as vinyl chloride, it has been the practice heretofore to rotate either each structure or a cutting tool to cut off the surplus material. Such a technique, however, entails the risk of entrance of some of the resulting shavings or chips into the container structure. Accordingly, a device for removing the shavings or chips becomes necessary, whereby the entire apparatus tends to become complicated.

In the case of a container structure of a relatively pliable resin such as a polyethylene, a frequently practiced technique is to use a specially devised cutting tool with a guillotine-like action to cut off the surplus material without rotating either the container structure or a cutting tool. This technique is disadvantageous, however, in that the opening rim part cannot be formed with consistent accuracy, and defects such as deformation of screw thread parts impose difficulty in obtaining tight seals.

SUMMARY OF THE INVENTION

It is an object of the present invention to provide an apparatus for automatically trimming opening rim parts of synthetic-resin container structures which is not accompanied by the above-described difficulties, and in which the container structures can be trimmed efficiently and accurately at a high production rate.

According to the present invention, briefly summarised, there is provided an apparatus of the character referred to above which is characterised by the combination of a revolving support structure, a plurality of trimming devices mounted on the support structure to undergo orbital revolution thereon, each of the trimming devices comprising a rotary member rotatably supported for rotation about its own axis and adapted to hold a container structure inserted thereinto, clamping means for firmly holding the neck part of the container structure near its opening rim, and a cutting-tool device actuable to advance and retract a cutting tool to and away from the rim part, and means for coordinating the operations of these parts thereby to accomplish the following operation steps, with respect to each trimming device during one orbital revolution thereof.

A. Causing the rotary member to be in a non-rotating state for receiving a container structure and causing the clamping device to hold the rim part of the container structure.

B. Causing the rotary member to rotate about its axis and the cutting tool to advance toward the rim part to cut off surplus material therefrom.

C. Braking the rotary member and stopping the same in a specific angular position.

D. Causing the clamping device to open and release the container structure thereby to permit the same to be discharged from the apparatus.

These operational steps are repeatedly and continuously carried out with respect to all trimming devices in succession.

The nature, principle, details, and utility of the invention will be more clearly apparent from the following detailed description with respect to an example of preferred embodiment of the invention when read in conjunction with the accompanying drawings, in which like parts are designated by like reference numerals.

BRIEF DESCRIPTION OF THE DRAWINGS

In the drawings:

FIGS. 4, 5, and 6 are a plan view, a fragmentary elevation, and a plan view, respectively, showing details of an opening rim holding plate and related parts provided in the apparatus; and FIG. 7 is a fragmentary elevation showing the manner in which a container structure is discharged.

DETAILED DESCRIPTION OF THE INVENTION

Figure 1:
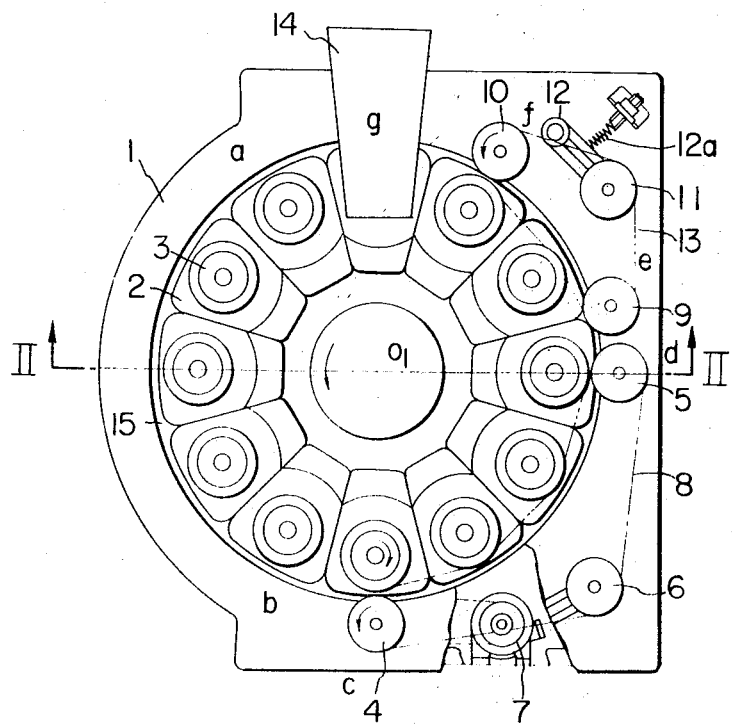
FIG. 1 is a plan view of the entire apparatus according to the invention.
Figure 2:
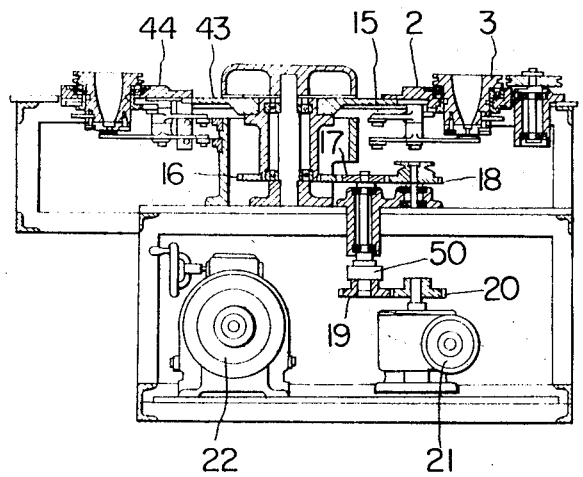
FIG. 2 is an elevation, in section taken along the plane indicated by line II—II in FIG. 1 as viewed in the arrow direction.
Figure 3:
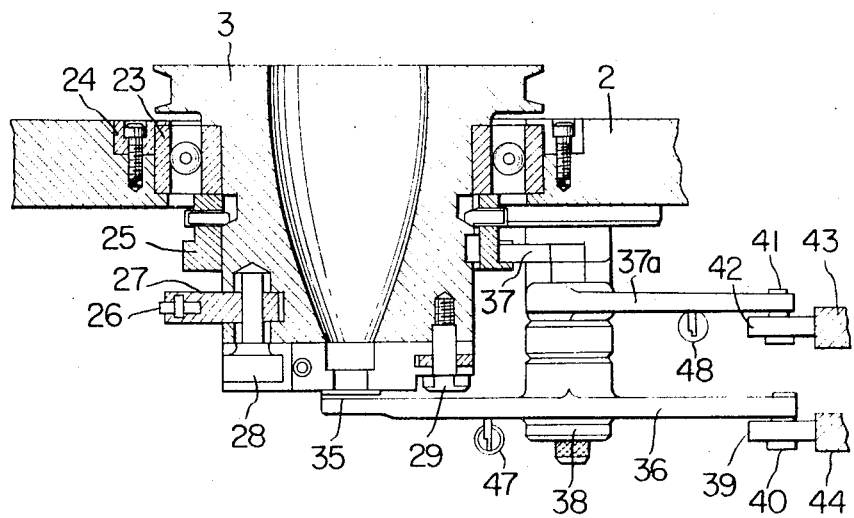
FIG. 3 is a fragmentary elevation, partly in vertical section, showing one of a plurality of container holding devices installed in the apparatus shown in FIGS. 1 and 2.

As shown in FIGS. 1 and 2, the example of an apparatus according to the invention has a main structure 1 rotatably supporting a horizontal turn-table 15 of disk form which rotates continuously during operation about a vertical axis. A number of container holding devices 3 are mounted with equal spacing on this turn-table 15 on a circle coaxial therewith, each container holding device 3 having a construction as shown in FIG. 3.

More specifically, each container holding device 3 has a main rotary part 3 rotatably supported through a bearing 23 by a mounting platform 2 and secured in place by bearing retaining fittings 24 and 25. At the lower end of the main rotary member 3, there is attached a mechanism for clamping the neck part of a container structure near its opening by means of clamp arms 33 and 34 pivotally supported at respective proximal ends by a common pivot pin 29 fixed to the rotary member 3.

Figure 4:
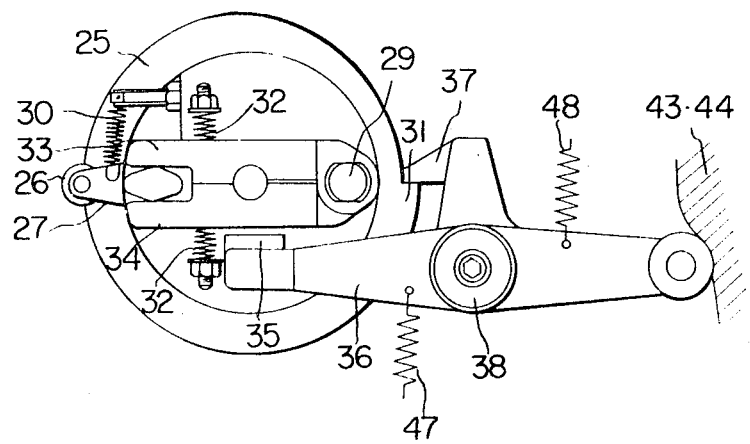

While the main rotary member 3 is rotating, the clamp arms 33 and 34 are caused by springs 32 to clamp the opening rim part of a container as shown in FIGS. 4 and 5. At the container feeding station and the container discharging station, as described hereinafter, however, a cam 28 fixed to a lever 27 is caused by a cam surface 45 acting through a cam follower 26 to rotate as indicated in FIG. 6, thereby causing the clamp arms 33 and 34 to open against the force of the springs 32 and thereby to release the container opening rim part.

On one hand, a catch 37 on one end of a lever 37a pivoted on a horizontal pivot 38 is urged to rotate in the counterclockwise direction as viewed in FIG. 4 by a spring, and, when a cam follower roller 42 on the other end of the lever 37a is not in contact with a cam 43, the catch 37 is thereby caused by the spring to engage with a ledge or shoulder 31 formed at one part of the bearing retaining fitting 25 thereby stopping the rotation of the main rotary member 3.

Surplus material on the opening rim part of a container inserted in inverted state into the rotary member 3 and held securely by the above-described clamp arms 33 and 34 is cut and removed by a cutting tool or knife 35 mounted on one end of a knife holder 36 which is essentially a lever pivoted on the aforementioned pivot 38 and having at the other end thereof a cam follower roller 39 which is rotatably supported on a pin shaft 40 and follows the profile of a horizontal cam 44. The cam 44 thereby actuates the knife holder 36, overcoming the force of a return spring 47 which urges the lever in the counterclockwise direction as viewed in FIG. 4, to move the knife 35 into cutting position.

The manner in which the above-described operational actions of individual parts are interrelated to the operation of the entire apparatus as well as the organisation and operation of other parts of the apparatus will be apparent from the following description of the sequential steps of operation with respect to a single container holding device 3.

In the angular interval a–b in the planetary revolution in the counterclockwise direction (as viewed in FIG. 1) of each container holding device 3 mounted on the turn-table 15, the rotation of this device about its axis is prevented by its catch 37 as indicated in FIGS. 3 and 4, and, moreover, the clamp arms 33 and 34 of this device are held in opened state by the cam 28 and cam surface 45. While the container holding device 3 is thus orbitally revolving in this interval a–b, an unfinished container structure 49 is inserted in inverted state into the main rotary member 3 of this device.

Then, when the container holder device 3 reaches the position b, cam surface 45 recedes relative to cam follower 26, which is thereby released, and cam 28 is rotated by spring 30 to permit clamp arms 33 and 34 to be closed by spring 32 thereby to clamp and firmly hold the neck part of container 49. At the same time, cam surface 43, acting through cam follower roller 42 and lever 37a, causes catch 37 to release rotary member 3.

In the orbital interval c–d, the outer peripheral part of the main rotary member 3 with the container 49 inserted therein contacts a belt 8 which is passed around pulleys 4, 5, and 6 and, driven by a motor 7, is moving at a high speed in the direction opposite that of the orbital revolution of the rotary part 3. Consequently, rotary member 3 is rotated in the clockwise direction (as viewed in FIG. 1) about its axis. Then, as this container holding device 3 advances into the interval c–d, the corresponding knife 35 is caused by cam surface 44 to be fed gradually to cut off surplus material from the opening rim part of the container 49.

In the interval e–f of the orbital path of the container holding device 3, a belt 13 passed around pulleys 9, 10, and 11 is driven by gears 17 and 18 through these pulleys. Pulley 11 is rotatably supported on an arm pivoted at its proximal end on pivot 12, and a spring 12a connected to the arm is provided for adjusting braking force. The main rotary member 3 is braked in this interval by the belt 13. At the same time, cam surface 43 recedes from cam follower 42, and catch 37 is caused by spring 48 to catch shoulder 31 thereby to stop positively the rotation of the rotary part 3 at a specific position.

At orbital position f, clamp arms 33 and 34 are opened by the action of cam surface 45 and release the neck part of the container 49. Then, at position g, a stationary nozzle 46 directed upward is caused by an electrical signal to inject a pressurized fluid into container 49 and blast the container upward to be taken out through a duct 14. The now empty container holding device 3 thereupon moves in its orbital path to its original position at a to repeat the above-described operation. All of the other container holding devices 3, of course, also perform the same operation successively in a continuous manner.

The aforementioned turn-table 15 is driven by a motor 22 through a speed-reduction device 21 and gears 20, 19, 17, and 16. A device 50 for preventing reverse rotation is provided to prevent mechanical damage or wear due to reverse rotation.

Thus, the present invention provides an apparatus for automatically and efficiently cutting off surplus material from the opening rim parts of synthetic resin container structures held in a plurality of container holding devices which undergo both orbital revolution and rotation about respective axes, in which apparatus all operations after insertion of a container structure into each container holding device during a period when its rotation is stopped are carried out automatically.

We claim:

1. Apparatus for automatically trimming opening rim parts of synthetic-resin container structures comprising, in combination: a revolving support structure (15) driven by motive power means; a plurality of trimming devices mounted on said support structure to undergo orbital revolution thereon, each of said trimming devices comprising a container holding device (3) provided with a rotary member (3) rotatably supported for rotation about its own axis and adapted to hold a container structure (49) inserted thereinto, clamping means rotating with said rotary member and adapted to clamp and firmly hold said container structure near the rim of an opening thereof, and a cutting-tool device actuatable to advance and retract a cutting tool (35) to and away from said rim part; and coordinating means for coordinating the operations of the above named parts thereby to accomplish the operational steps, with respect to each trimming device during one orbital revolution thereof, of A. causing the rotary member to stop its rotation and, in that state, receive a container structure to be trimmed and said clamping means to hold said rim part of said structure,
   B. causing the rotary member to rotate about its axis and the cutting-tool device to advance to said rim part thereby to trim surplus material thereof.
   C. braking the rotary member and stopping the same in a specific angular position, and
   D. causing the clamping means to open and release the container structure thereby to permit the same to be discharged from the apparatus, the foregoing steps A, B, C, and D being repeatedly and continuously carried out with respect to all trimming devices in succession.

2. Apparatus as claimed in claim 1, in which said revolving support structure is a horizontal turn-table supported to revolve about a central vertical axis, and said coordinating means comprises cam-and-follower mechanisms provided for each trimming device and rendered operative by said orbital revolution to actuate respectively said clamping means in steps A and D, said cutting-tool device in step B, and catch means for locking said rotary member in said specific angular position in step C and during steps D and A, rotary power transmission means for rotating each rotary member in step B, braking means for braking each rotary member in step C, and discharging means for ejecting and discharging each container structure in step D.

* * * * *